United States Patent [19]

Harrold et al.

[11] Patent Number: 5,024,092

[45] Date of Patent: Jun. 18, 1991

[54] METHOD AND APPARATUS FOR SELECTIVE TRANSMISSION AND REFLECTION OF SOUND THROUGH A SOLID

[75] Inventors: Ronald T. Harrold, Murrysville Boro; Zal N. Sanjana, Mt. Lebanon, both of Pa.

[73] Assignee: Westinghouse Electric Corp., Pittsburgh, Pa.

[21] Appl. No.: 568,281

[22] Filed: Aug. 16, 1990

[51] Int. Cl.[5] .............................................. G01N 9/24

[52] U.S. Cl. ........................................ 73/602; 73/642; 73/644

[58] Field of Search ................. 73/590, 602, 645, 644, 73/642; 367/152

[56] References Cited

U.S. PATENT DOCUMENTS 4,590,803 5/1986 Harrold .

OTHER PUBLICATIONS

Harrold and Sanjana, *Acoustic Waveguide Sensors for Smart Structures and Skins, Fiber Optic Smart Structures and Skins II*, Society of Photo Optical Instrumentation Engineers Proceedings Series, vol. 1170, pp. 462–471 (1989).

Urick, *Principles of Underwater Sound*, McGraw Hill, pp. 289–293.

Pollard, *Sound Waves in Solids*, Pion Limited, Chapter 4, (1977).

Harrold, *Acoustical Technology Applications in Electrical Insulation and Dielectrics*, IEEE Transactions on Electrical Insulation, vol. EI-20, No. 1 (Feb. 1985).

*Primary Examiner*—John E. Chapman
*Assistant Examiner*—William Francos
*Attorney, Agent, or Firm*—D. Schron

[57] ABSTRACT

A device is disclosed which allows an object to be tuned to an incoming sound wave magnitude and wavelength, such that the sound wave will alternatively be passed therethrough without detectable reflection or be completely reflected. The apparatus is intended to be mounted within a hollow object and adjust the perceived distance between the exterior walls of that object to mimic a single thick wall. A signal processing means is supplied which detects the sound wave magnitude and wavelength impinging on the wall facing the sound wave source. The wavelength is passed to the signal processing means, which transmits a complimentary signal to the second wall of the hollow object. The complimentary signal allows the hollow object to resonate as a whole as if it were a solid of a thickness much different from its actual thickness, allowing the sound wave to pass undisturbed therethrough or be reflected therefrom.

34 Claims, 2 Drawing Sheets

METHOD AND APPARATUS FOR SELECTIVE TRANSMISSION AND REFLECTION OF SOUND THROUGH A SOLID

BACKGROUND OF THE INVENTION

1. Field of the Invention

The present invention relates to a method and apparatus for transmitting sound through and reflecting sound from a solid object. More specifically, the invention relates to a method and apparatus for altering the characteristics of an object such that sound waves will alternatively pass completely therethrough or be completely reflected therefrom.

2. Description of the Prior Art

A general characteristic of solid objects is that they reflect sound waves. Sound is transmitted in waves comprised of compressions and rarefactions of the medium through which the sound is passing, be it a solid, liquid or gas. The transmission characteristics of each medium are based on the density of the medium. Gas, being the most compressible of the three, is the poorest conductor of sound waves. Solids, therefore, provide the best transmission of sound. Solids, furthermore, due to their inherent formability, may be adapted to transmit sound wave energy over a distance in a controlled manner.

This characteristic has been utilized to create the acoustic waveguide. The acoustic waveguide is analogous to a wire conductor in the electrical field. Just as the wire conductor permits the controlled passage of a current from one end to another, the acoustic waveguide transmits sound wave energy from one point to another. The waveguide is generally in the form of an elongated solid, similar to a thick wire. The waveguide may also be hollow or in any geometric form. Additionally, the transmission medium within the waveguide may be a contained liquid or gaseous material. A common example of a waveguide is the medical stethoscope.

The waveguide, in its preferred embodiment, is tuned in shape and density to the frequency of the sound wave that is to be carried Such tuning allows for the optimal transmission of sound energy within the waveguide. A waveguide which is intended to carry a range of frequencies, however, must be adapted to carry all at some acceptable level, rather than any one at its optimal level.

Sound wave energy is also affected by changes in the transmission medium. When sound waves encounter a change in the density of the transmission medium, at least a portion of the wave energy is reflected away from the surface of the new medium. The remaining portion passes through this medium. Acoustic impedance, which is the product of the density of the waveguide material and the velocity of sound in the material, is utilized to describe and measure the reflection of sound waves at the interface of two media. If the acoustic impedances of two abutting materials are radically different, then reflection of sound waves within one medium from the interface is maximized. As the acoustic impedances of the two materials become closer in value, reflection is lessened, and a greater portion of the sound wave energy passes into and through the second medium. If the acoustic impedances are equal, the sound wave energy will pass with little or no loss into and through the second medium.

Sound waves will also pass through objects which have a thickness equal to one half of their wavelength. This is regardless of the change in acoustic impedance between the object and its surrounding medium. This, like an interface between media of equal acoustic impedance, will cause little or no reflection of the sound waves.

The limitation of this phenomena is that the object must be sized exactly one half the wavelength of the sound which is intended to pass therethrough. If the wavelength of the sound waves is unknown, or of a varying quantity, then the required size of the object cannot be predicted.

What has not been recognized by the art, therefore, is a method or apparatus which can change the perceived thickness of an object, such that a sound wave having a wavelength which is not preselected will pass therethrough without substantial or detectable reflection, or alternatively, will be completely reflected therefrom.

SUMMARY OF THE INVENTION

A method and associated apparatus are disclosed which allow a hollow object to be tuned to an incoming sound wave wavelength, such that the sound wave will pass therethrough without detectable reflection. The apparatus is intended to be mounted within a hollow object to adjust the perceived distance between the exterior walls of that object. The apparatus comprises a first waveguide mounted to one of the walls of the hollow object. A second waveguide is mounted to the second wall of the hollow object. The waveguides are connected to a signal processing means which detects the sound wave magnitude and wavelength impinging on the wall facing the sound wave source.

As the sound wave strikes this first wall, its magnitude and wavelength is passed to the signal processing means, which transmits a complimentary signal to the second waveguide which conveys the sound wave to the second wall of the hollow object. The complimentary signal allows the hollow object to resonate as a whole as if it were of a thickness much different from its actual thickness. When utilized for the purpose of allowing the sound wave to pass undisturbed through the hollow object, the object's resonance is tuned to adjust the perceived thickness to one half the wavelength of the incoming sound waves. Additionally, if the object is intended to reflect all of the incoming sound wave energy, such that none passes through the object, a separate thickness may be selected. To achieve complete reflection of the incoming sound wave energy, a perceived thickness of one quarter of the incoming wavelength is selected.

These and other advantages and features of the present invention will be more fully understood on reference to the presently preferred embodiments thereof and to the appended drawings.

DESCRIPTION OF THE PREFERRED EMBODIMENTS

Figure 1:
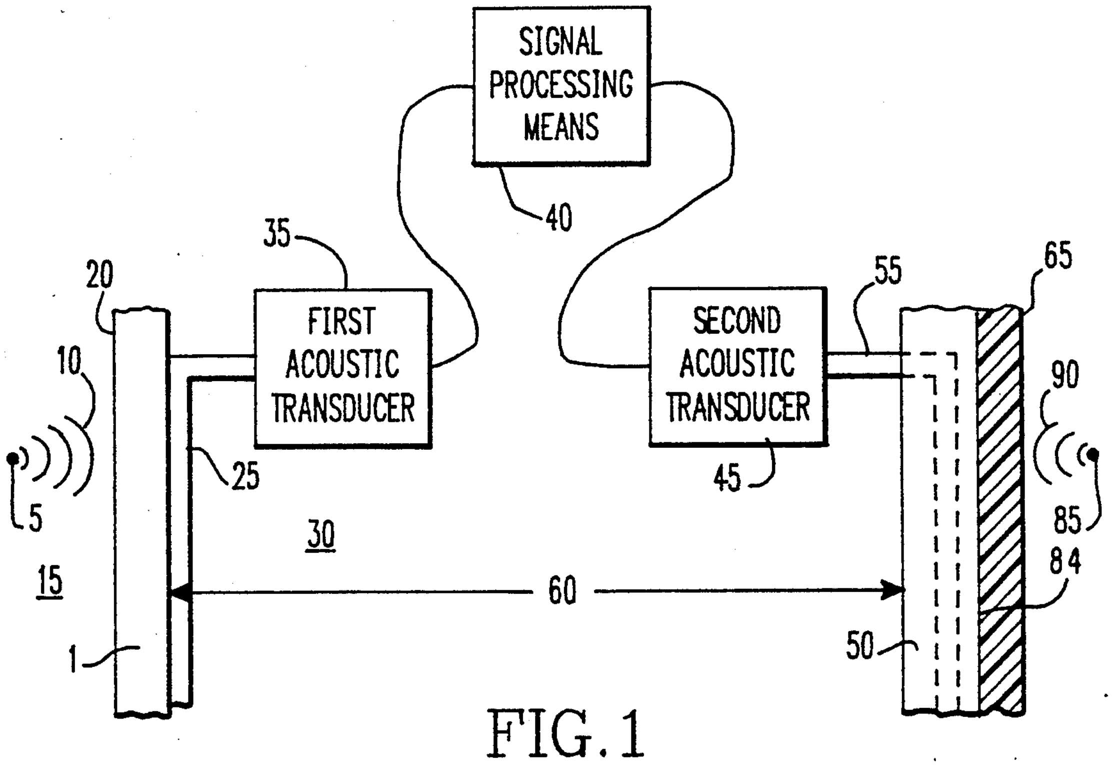
FIG. 1 is a diagrammatic view of a first embodiment of the described apparatus.

Referring to FIG. 1, a first embodiment of the device is shown. A first wall 1 is shown facing sound wave source 5. Sound waves 10 emanate from sound wave source 5 through first medium 15. The sound waves 10 impinge upon the outer surface 20 of first wall 1. The sound wave energy is transmitted from first wall 1 to first acoustic waveguide 25. First acoustic waveguide 25 may be constructed of nichrome, polyester-fiberglas, optical fiber, steel, sapphire, quartz, plastics, glass, epoxy-fiberglas or similar materials. The acoustic waveguide is preferably constructed of a material which matches the coefficient of thermal expansion of the wall to which it is affixed. Acoustic waveguide 25 should preferably have an attenuation of less than 3 decibels per meter of length, such that the signal strength is not reduced beyond detection.

First acoustic waveguide 25 carries the sound energy for some distance through interior space 30. Interior space 30 is filled with some medium, which may or may not match that of first medium 15. First acoustic waveguide 25 should be selected of a material which will permit good transmission of the sound wave energy through this interior medium.

The sound wave energy is transmitted from first acoustic waveguide 25 to first acoustic transducer 35. The transducer converts the sound wave energy to an electrical voltage which is proportional to the magnitude and wavelength of the sound waves 10. This electrical voltage is then passed to the signal processing means 40.

The signal processing means 40 detects the voltage of the incoming electrical signal and calculates the time delay and proper voltage of its output signal. This will be described in greater detail at a later point in this disclosure. The output signal is then passed to a second acoustic transducer 45 which converts the electrical signal to sound wave energy having a magnitude and wavelength proportional to the voltage of the electrical signal. This sound wave energy is conveyed to second wall 50 through second acoustic waveguide 55. Second wall 50 is spaced a known, fixed distance 60 from first wall 1. As shown in FIG. 1, the acoustic transducer may be affixed to the surface of the object, as illustrated by first acoustic transducer 25 or be mounted within the object, as illustrated by second acoustic transducer 55.

Figure 2:
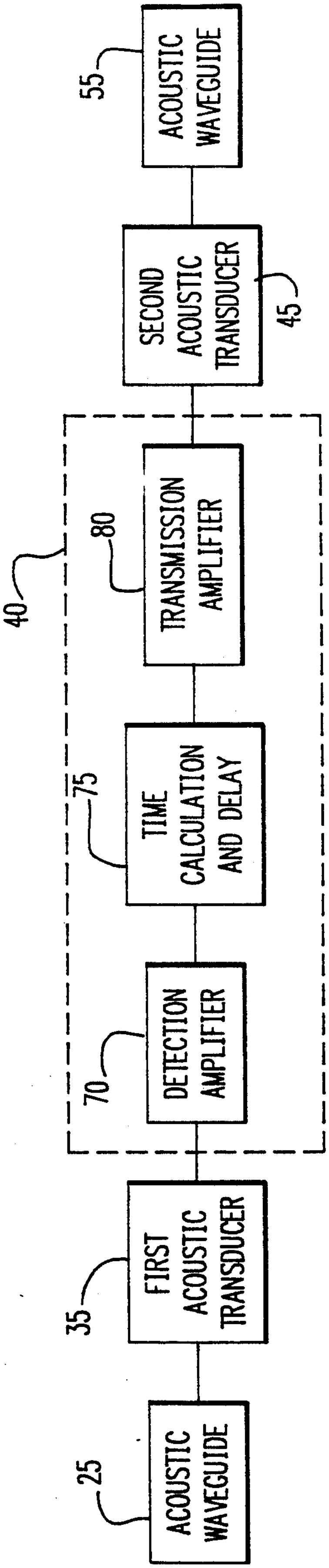
FIG. 2 is a diagrammatic illustration of the circuitry of the device shown in FIG. 1.

The operation of the device is illustrated with reference to FIGS. 1 and 2. FIG. 2 illustrates the signal processing means in greater detail. Sound wave energy is introduced to first acoustic waveguide 25. The sound wave energy is transformed into electrical energy by first acoustic transducer 35. The voltage of the electrical signal is proportional to the input sound wave magnitude and wavelength. This signal is directed to a detection amplifier 70 which brings the low voltage output of the first acoustic transducer 35 up to a usable level. The preferred gain of detection amplifier 70 is 10 to 100 dB.

Time calculation and delay circuitry 75 receives this signal and calculates the wavelength of the incoming sound waves. As the velocity of sound in the medium of wall 1 is known, the distance of one half of the incoming sound wavelength can be calculated, as can the time that the sound wave would pass through the width of wall 1. An electrical signal is then transmitted by the time calculation and delay circuitry. This signal passes through transmission amplifier 80 to second acoustic transducer 45, where it is transformed into sound energy having the correct wavelength and timing to arrive at second wall 50 at the precise time that the original sound wave would have reached this second wall 50, had it traveled one half of the wavelength in wall material 1. The actual calculated delay would be the time for the soundwave to travel a distance of one half of the wavelength in the medium of the material of wall 1. The acoustic signal is passed from second acoustic transducer 45 to second wall 50 through an appropriate acoustic waveguide 55. Wall 50 should preferably be of the same material as wall 1.

With this tuned condition, the soundwave energy in wall 1 now appears within wall 50 where it exits at surface 84 and may be absorbed by the sound absorbing material 65. Sound absorbing material 65 preferably has an acoustic impedance value similar to that of medium 15.

This apparatus and method may also be utilized to prevent the passage of all sound waves through the object. The process is basically similar to that previously described but the time delay is altered to one quarter of the incoming sound wavelength rather than one half. This will cause all incoming sound waves to be reflected. As shown in FIG. 1, second sound waves 90 are emitted from second sound wave source 85. The sound waves come into contact with sound absorbing material 65. Any sound which passes through sound absorbing material 65 impinges upon the outer surface 84 of second wall 50. The sound wave energy is transmitted to second acoustic transducer 45 by second acoustic waveguide 55. The resulting electric signal is then passed to the signal processing means 40. An electric output signal is transmitted to first acoustic transducer 35, and is transformed into sound wave energy for ultimate transfer to first wall 1. This electrical output is of the proper voltage and timing to reach first wall 1 and cause resonance of first wall 1 to simulate the passage of a sound wave through the wall medium 1 over a distance of one quarter of the sound wavelength. In effect, wall 50 blocks the passage of soundwaves because reflected energy from wall 1 is fed back via first acoustic waveguide 25, first acoustic transducer 35, signal processing means 40, second acoustic transducer 45 and second acoustic waveguide 55 into wall 50. If desired, this method may be employed to reflect soundwaves 10 from the surface of wall 1.

Sound absorbing material 65 may be mounted at any point to prevent the passage of sound waves through the object. The material 65 is shown mounted on the outer surface 84 of second wall 50.

Figure 3:
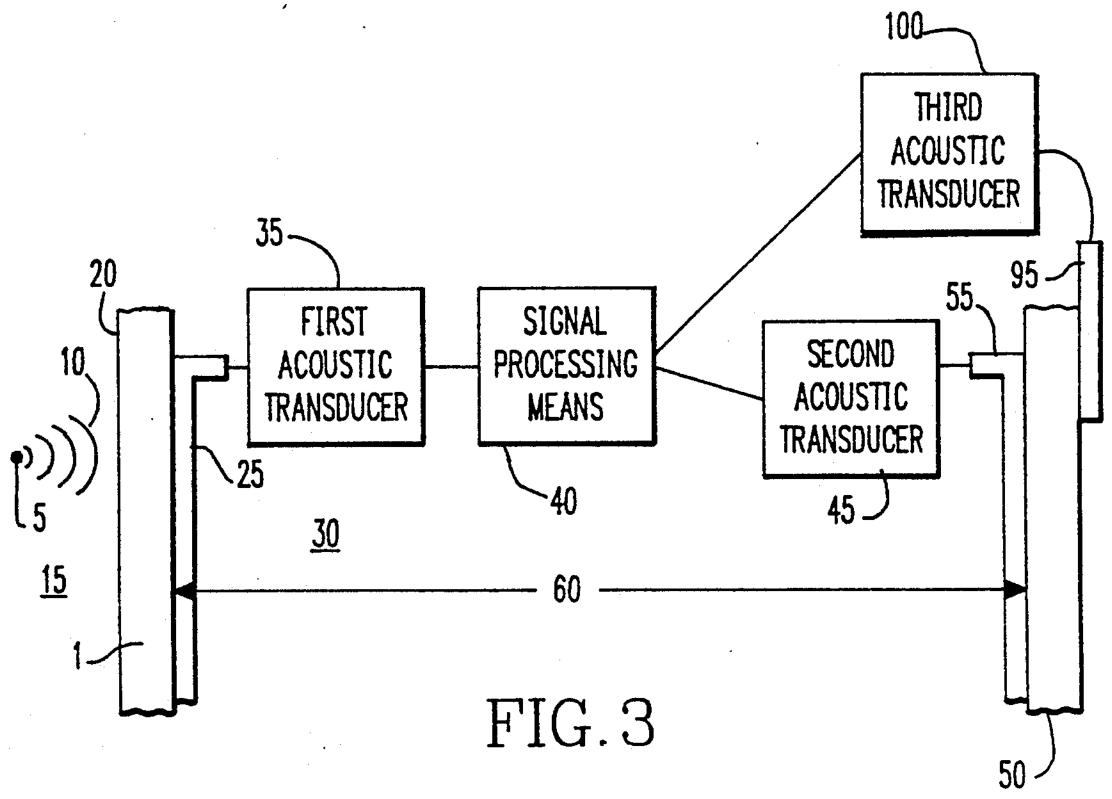
FIG. 3 is a diagrammatic view of a second embodiment of the described apparatus.

A second embodiment of the device is shown in FIG. 3. As with the first embodiment, the sound waves 10 impinge upon the outer surface 20 of first wall 1. The sound wave energy is transmitted from first wall 1 to first acoustic waveguide 25. The sound wave energy is transmitted from first acoustic waveguide 25 to first acoustic transducer 35. The transducer converts the sound wave energy to an electrical voltage which is proportional to the wavelength of the sound waves 10. This electrical voltage is then passed to the signal processing means 40. The signal processing means 40 detects the voltage of the incoming electrical signal and calculates the time delay and proper voltage of its output signal which is then passed to a second acoustic transducer 45 which converts the electrical signal to sound wave energy having a wavelength proportional to the voltage of the electrical signal. This sound wave energy is conveyed to second wall 50 through second acoustic waveguide 55. Second wall 50 is again spaced a known, fixed distance 60 from first wall 1.

In the second embodiment, a third acoustic waveguide 95 is affixed to second wall 50. This third waveguide is preferably placed exterior to the object. The third waveguide 95 is utilized to detect sound waves passing through second wall 50. Third waveguide 95 transmits sound wave energy from these waves to third acoustic transducer 100, where the sound wave energy is transformed into electrical energy. The voltage of the electrical signal is again proportional to the magnitude and wavelength of the detected sound wavelength. The electrical signal is then fed back into the time calculation and delay circuitry 75 of the signal processing means 40. This information is utilized to maximize the sound wave energy passing through the object and to fine tune the time delay. Additionally, this data may be utilized to confirm the wavelength of the sound waves 10 as detected by first acoustic waveguide 25.

An example of the system parameters for a 1000 Hz acoustic wave is given below:

EXAMPLE

A 3 meter thick steel plate positioned in a water medium allows a 1000 Hz acoustic wave to pass right through the steel without loss. The velocity of longitudinal waves in steel is 6000 meters/second. The wavelength in steel at 1000 Hz is calculated as:

$$= \frac{v}{f} = \frac{6000}{1000} = 6 \text{ meters}$$

One half wavelength is then 3 meters.

As shown in FIG. 1, two closely spaced thin steel plates with waveguide attached thereto, feed back to induce resonance, providing a perceived thickness of 3 meters. The incoming 1000 Hz wave passes "through" the resonant structure as described below. In effect, the acoustic energy flows from plate 50 as if it had passed through a 3 meter thick steel plate. The time for an acoustic wave to travel 3 meters is calculated as:

$$t = \frac{d}{v} = \frac{3}{6000} = \frac{1 \text{ sec.}}{2000} = 0.5 \text{ milliseconds}$$

While we have described a present preferred embodiment of the invention, it is to be distinctly understood that the invention is not limited thereto but may be otherwise embodied and practiced within the scope of the following claims.

We claim:

1. An apparatus for facilitating the complete transmission of sound waves through an object, the object having at least two walls forming a known distance therebetween, the apparatus comprising:

sound wave detection means affixed to a first wall of the object, the first wall being that which is closest to a source of initial sound waves;

first transducer means affixed to said sound wave detection means, said first transducer means adapted to transform said initial sound waves into electronic signals;

second transducer means for conversion of electronic signals into secondary sound waves;

sound wave emission means affixed to said second transducer means and a second wall of the object, the second wall being opposite said first wall; and signal processing means, electronically connected to said first and second transducer means, said signal processing means adapted to:

calculate the wavelength of said initial sound waves impinging on said sound wave detection means, calculate the time necessary to pass a distance one half of said wavelength minus the known distance between said walls, and emit an electronic signal to said second transducer means, the electronic signal timed such that it will cause the emission of secondary sound waves of identical wavelength as said initial sound waves from said sound wave emission means at the time calculated.

2. An apparatus as described in claim 1, wherein said sound wave detection means is constructed of a material which matches the coefficient of thermal expansion of the wall to which it is affixed.

3. An apparatus as described in claim 2, wherein said sound wave detection means is constructed of a material selected from the group consisting of nichrome, polyester-fiberglas, optical fiber, steel, sapphire, quartz, plastics, glass and epoxy-fiberglass.

4. An apparatus as described in claim 3, wherein said sound wave detection means is constructed of a material having an attenuation of less than 3 decibels per meter of length.

5. An apparatus as described in claim 1, wherein said sound wave emission means is constructed of a material which matches the coefficient of thermal expansion o the wall to which it is affixed.

6. An apparatus as described in claim 5, wherein said sound wave emission means is constructed of a material selected from the group consisting of nichrome, polyester-fiberglas, optical fiber, steel, sapphire, quartz, plastics, glass and epoxy-fiberglass.

7. An apparatus as described in claim 5, wherein said sound wave emission means is constructed of a material having an attenuation of less than 3 decibels per meter of length.

8. An apparatus as described in claim 1, wherein said sound wave detection means and said sound wave emission means are surrounded by a first medium having an acoustic impedance, the sound wave detection means and the sound wave emission means being constructed of a material having an acoustic impedance significantly different from the surrounding first medium.

9. An apparatus as described in claim 8, wherein said sound wave detection means and the sound wave emission means have an acoustic impedance that is about 30 times greater than that of the surrounding first medium.

10. An apparatus as described in claim 8, wherein said initial sound waves move through a second medium, and wherein the second medium exists between the first and second walls of the object, said second medium having the same acoustic impedance as the first medium.

11. An apparatus as described in claim 8, wherein said sound wave detection means and said sound wave emission means have an acoustic impedance equal to the walls to which they are affixed.

12. An apparatus as described in claim 1, wherein said signal processing means further comprises a detection amplifier, time calculation and delay circuitry and a transmission amplifier.

13. An apparatus as described in claim 12, wherein said detection amplifier has a gain in the range of 10 to 100 dB.

14. An apparatus as described in claim 1, further comprising a layer of sound absorbing material affixed to one of the walls of the object.

15. An apparatus as described in claim 1, wherein either of said sound wave detection means and said sound wave emission means are mounted to an exterior surface of one of said walls of the object.

16. An apparatus as described in claim 1, wherein either of said sound wave detection means and said sound wave emission means are mounted interior to one of said walls of the object.

17. An apparatus for facilitating the complete reflection of sound waves from an object, the object having at least two walls forming a known distance therebetween, the apparatus comprising:

sound wave detection means affixed to a first wall of the object, the first wall being that which is closest to a source of initial sound waves;

first transducer means affixed to said sound wave detection means, said first transducer means adapted to transform said initial sound waves into electronic signals;

second transducer means for conversion of electronic signals into secondary sound waves;

sound wave emission means affixed to said second transducer means and a second wall of the object, the second wall being opposite said first wall; and signal processing means, electronically connected to said first and second transducer means, said signal processing means adapted to:

calculate the wavelength of said initial sound waves impinging on said sound wave detection means, calculate the time necessary to pass a distance one quarter of said wavelength minus the known distance between said walls, and emit an electronic signal to said second transducer means, the electronic signal timed such that it will cause the emission of secondary sound waves of identical wavelength as said initial sound waves from said sound wave emission means at the time calculated.

18. An apparatus as described in claim 17, wherein said sound wave detection means is constructed of a material which matches the coefficient of thermal expansion of the wall to which it is affixed.

19. An apparatus as described in claim 18, wherein said sound wave detection means is constructed of a material selected from the group consisting of nichrome, polyester-fiberglas, optical fiber, steel, sapphire, quartz, plastics, glass and epoxy-fiberglass.

20. An apparatus as described in claim 19, wherein said sound wave detection means is constructed of a material having an attenuation of less than 3 decibels per meter of length.

21. An apparatus as described in claim 17, wherein said sound wave emission means is constructed of a material which matches the coefficient of thermal expansion of the wall to which it is affixed.

22. An apparatus as described in claim 21, wherein said sound wave emission means is constructed of a material selected from the group consisting of nichrome, polyester-fiberglas, optical fiber, steel, sapphire, quartz, plastics, glass and epoxy-fiberglass.

23. An apparatus as described in claim 21, wherein said sound wave emission means is constructed of a material having an attenuation of less than 10 decibels per meter of length.

24. An apparatus as described in claim 17, wherein said sound wave detection means and said sound wave emission means are surrounded by a first medium having an acoustic impedance, the sound wave detection means and the sound wave emission means being constructed of a material having an acoustic impedance significantly different from the surrounding first medium.

25. An apparatus as described in claim 24, wherein said sound wave detection means and the sound wave emission means have an acoustic impedance that is about 30 times greater than that of the surrounding first medium.

26. An apparatus as described in claim 24, wherein said initial sound waves move through a second medium, and wherein the second medium exists between the first and second walls of the object, said second medium having the same acoustic impedance as the first medium.

27. An apparatus as described in claim 24, wherein said sound wave detection means and said sound wave emission means have an acoustic impedance equal to the walls to which they are affixed.

28. An apparatus as described in claim 17, wherein said signal processing means further comprises a detection amplifier, time calculation and delay circuitry and a transmission amplifier.

29. An apparatus as described in claim 28, wherein said detection amplifier has a gain in the range of 10 to 100 dB.

30. An apparatus for facilitating the complete transmission of sound waves through an object, the object having at least two walls forming a known distance therebetween, the apparatus comprising:

first sound wave detection means affixed to a first wall of the object, the first wall being that which is closest to a source of initial sound waves;

first transducer means affixed to said first sound wave detection means, said first transducer means adapted to transform said initial sound waves into electronic signals;

second transducer means for conversion of electronic signals into secondary sound waves;

sound wave emission means affixed to said second transducer means and a second wall of the object, the second wall being opposite said first wall;

second sound wave detection means, affixed to said second wall of the object;

third transducer means, affixed to said second sound wave detection means, for transformation of sound waves into electronic impules; and signal processing means, electronically connected to said first, second and third transducer means, said signal processing means adapted to:

calculate the wavelength of said initial sound waves impinging on said first sound wave detection means, calculate the time necessary to pass a distance one half of said wavelength minus the known distance between said walls, and confirm the wavelength of the initial sound waves impinging on said first sound wave detection means by comparison to said first sound waves impinging on said second sound wave detection means, emit an electronic signal to said second transducer means, the electronic signal timed such that it will cause the emission of secondary sound waves of identical wavelength as said initial sound waves from said sound wave emission means at the time calculated, and adjust the timing of the electronic signal with respect to the comparison of the wavelength of the initial sound waves, impinging on said first sound wave detection means and said first sound waves impinging on said second sound wave detection means.

31. An apparatus as described in claim 30, wherein the second wall has a first surface and a second surface opposite said first surface and said second sound wave detection means is affixed to said first surface and said sound wave emission means is affixed to said second surface.

32. A method for facilitating the complete transmission of sound waves through an object, the object having at least two walls forming a known distance therebetween, the method comprising the steps of:

detecting the wavelength of said sound waves impinging on a first wall of the object;

calculating the time necessary for said sound waves to pass a distance one half of said wavelength minus the known distance between said walls; and emitting an electronic signal from a second wall, the electronic signal timed such that it will cause the emission of secondary sound waves of identical wavelength as said sound waves from said second wall at the time calculated.

33. A method for facilitating the complete transmission of sound waves through an object, the object having at least two walls forming a known distance therebetween, the method comprising the steps of:

detecting the wavelength of said sound waves impinging on a first wall of the object;

calculating the time necessary for said sound waves to pass a distance one half of said wavelength minus the known distance between said walls;

emitting an electronic signal from a second wall, the electronic signal timed such that it will cause the emission of secondary sound waves of identical wavelength as said sound waves from said second wall at the time calculated;

detecting said sound waves a second time from a point on said second wall; and adjusting the timing of said electronic signal based on said second detection.

34. A method for facilitating the complete reflection of sound waves from a wall of an object, the object having at least two walls forming a known distance therebetween, the method comprising the steps of:

detecting the wavelength of said sound waves impinging on a first wall of the object;

calculating the time necessary for said sound waves to pass a distance one quarter of said wavelength minus the known distance between said walls; and emitting an electronic signal from a second wall, the electronic signal timed such that it will cause the emission of secondary sound waves of identical wavelength as said sound waves from said second wall at the time calculated.

* * * * *